United States Patent Office 2,699,708
Patented Jan. 18, 1955

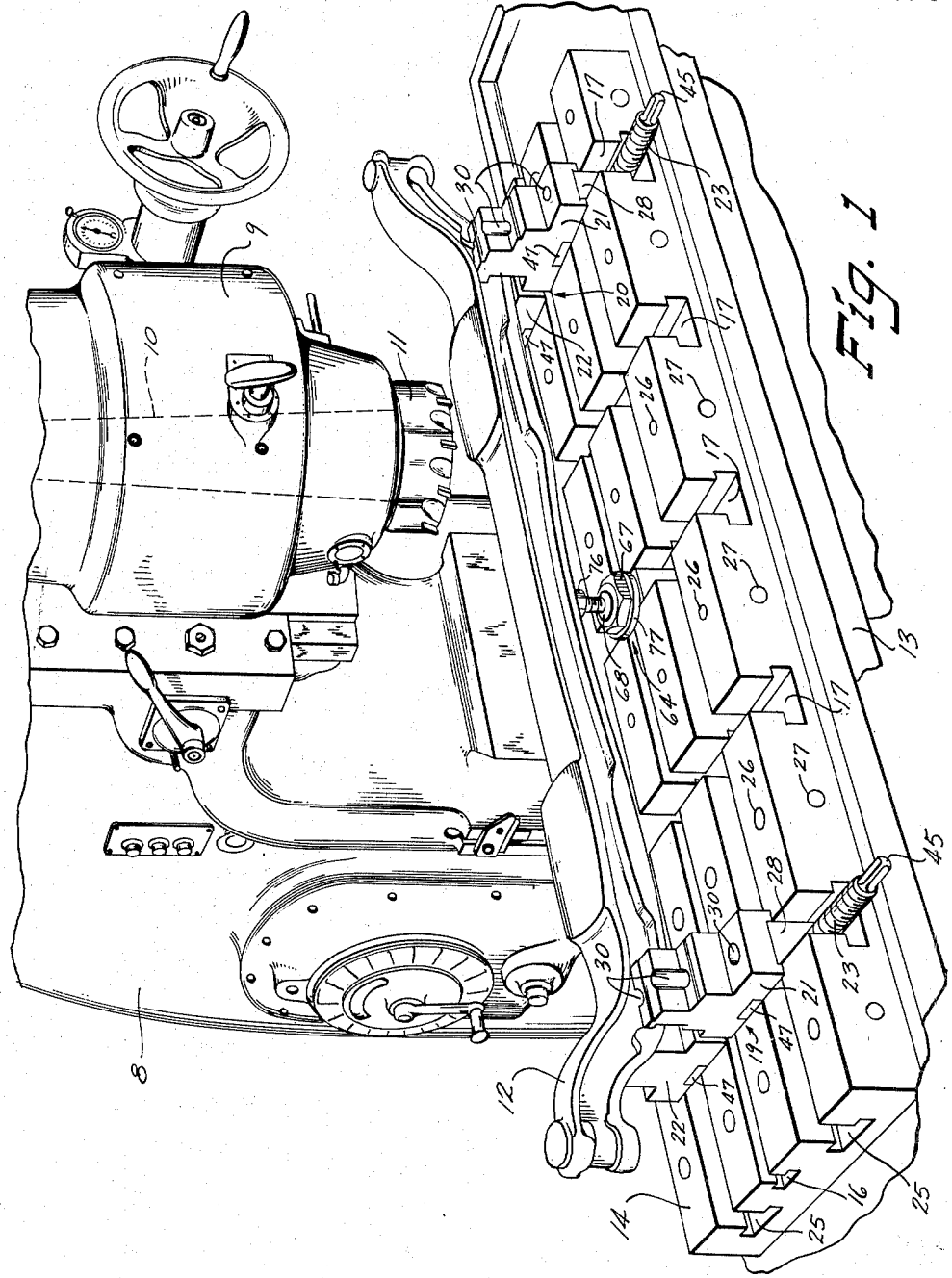

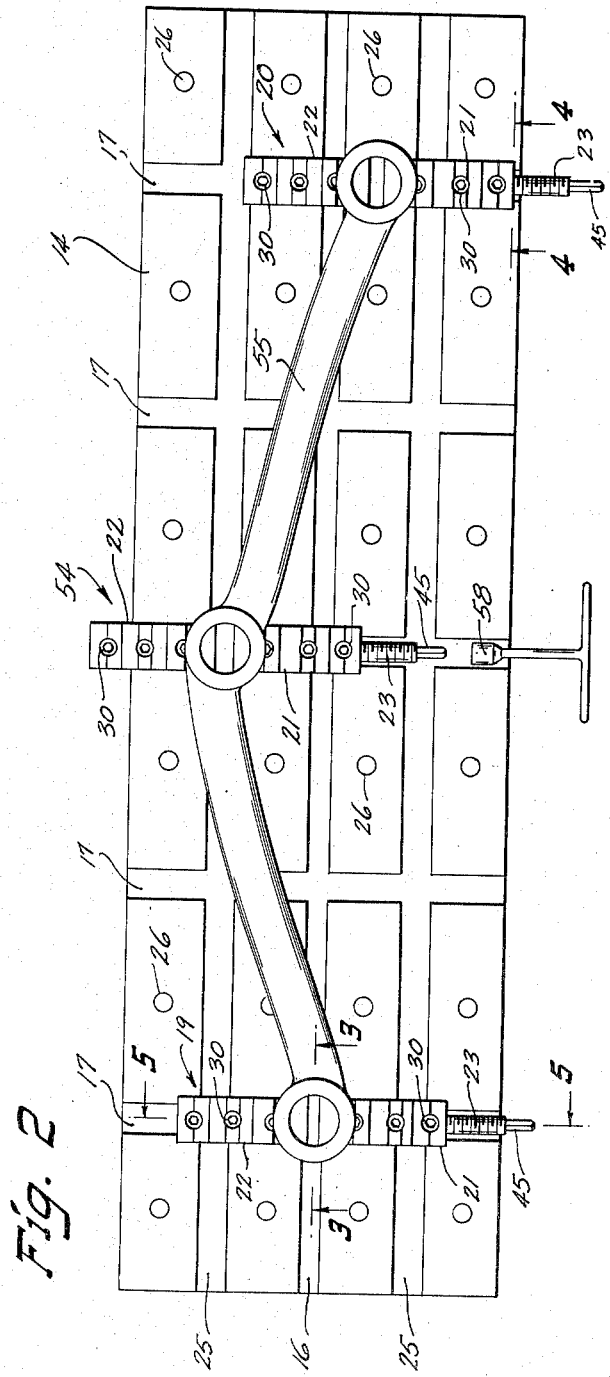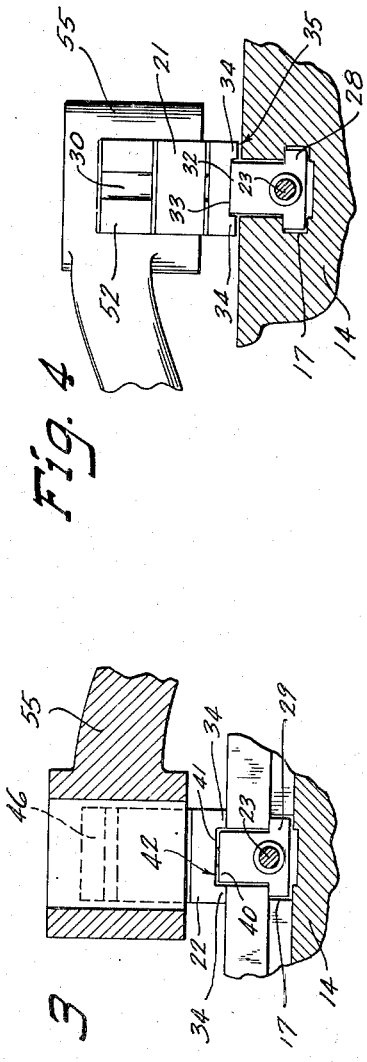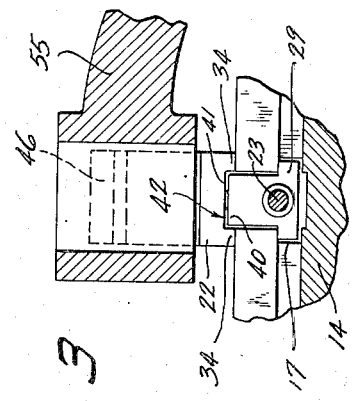

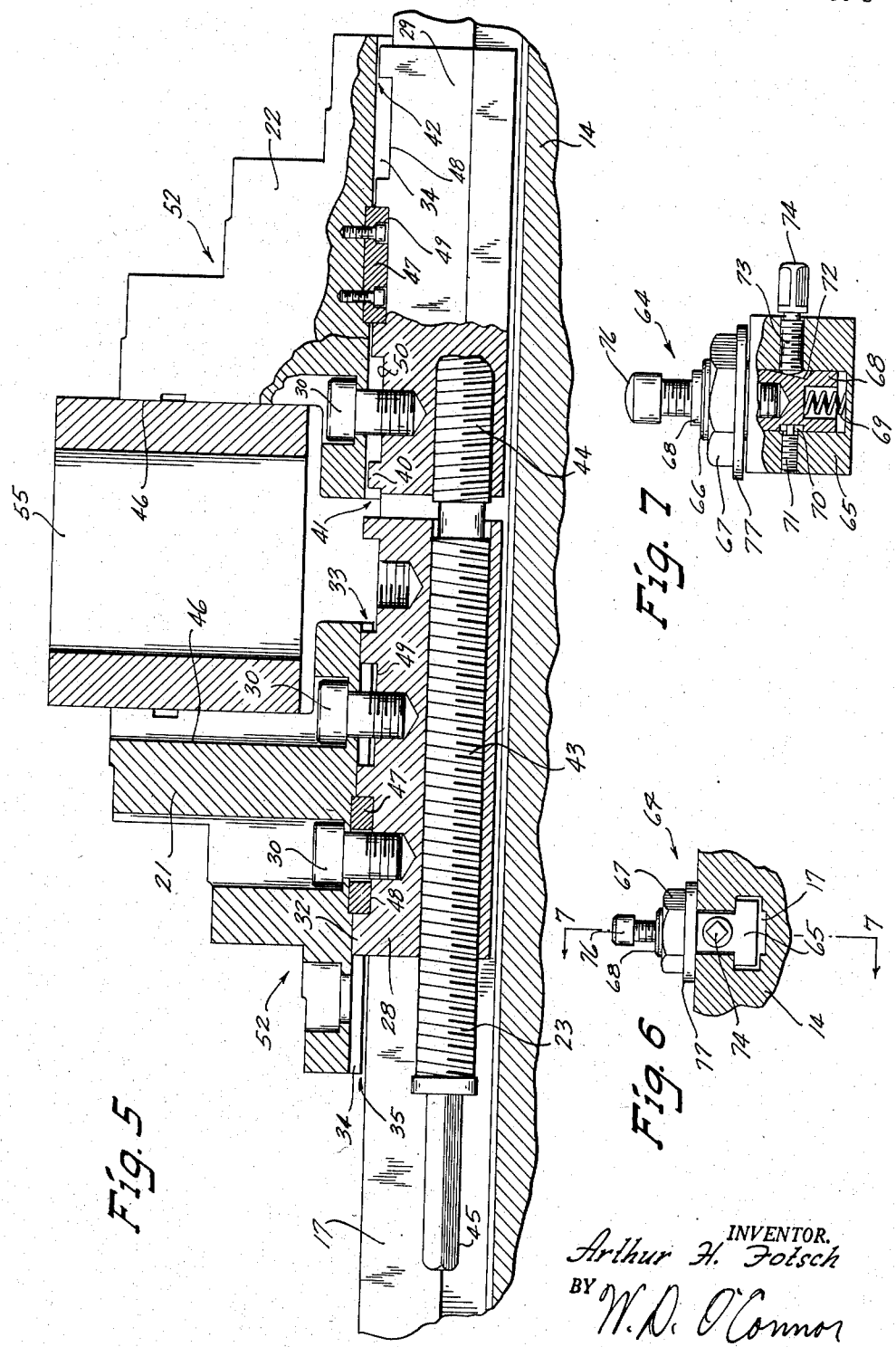

2,699,708

WORK HOLDER

Arthur H. Fotsch, West Allis, Wis., assignor to Kearney & Trecker Corporation, West Allis, Wis., a corporation of Wisconsin Application September 13, 1948, Serial No. 48,997

5 Claims. (Cl. 90—59)

This invention relates generally to improvements in machine tools and more particularly to an improved work holding table for a milling machine incorporating adjustable work securing members to constitute an expansible work securing chuck.

Heretofore in securing a workpiece to the work supporting table of a milling machine or other machine tool, it has been the usual practice to bolt either a work securing fixture or a standard vise having an intermediate supporting base directly to the machine tool table. For successively securing relatively small workpieces during repetitive cutting operations, the usual work supporting vise has customarily been employed. For securing large irregularly shaped workpieces, however, it has been necessary to construct a special fixture to meet the requirements of each type of workpiece upon which repetitive cutting operations were to be performed. If cutting operations were to be performed on only a few workpieces which did not justify the production of a special fixture, the workpiece has usually been bolted directly to the surface of the table and supported where necessary by individually and threadedly adjustable screw type jacks. These methods of securing a workpiece to a machine tool table are disadvantageous because of the time and inconvenience involved in setting up the table for securing a new workpiece of a different size or shape.

A general object of this invention is to provide a work chucking table for a machine tool that may be quickly and conveniently adjusted to releasably secure any size of irregularly shaped workpiece within the capacity of the machine.

Another object of the invention is to provide a large demountable work holding vise comprising a machine tool table provided with a plurality of longitudinal and transverse T-slots disposed to receive a plurality of removably and adjustably positionable work securing members.

Another object is to provide an improved work securing device comprising a pair of work clamping jaws threadedly connected for adjustment toward or away from each other and having bases so formed as to slidably fit within complementary shaped ways formed in the upper surface of a work supporting base or table.

A further purpose is to provide an improved work supporting and work securing apparatus comprising a base or table having a series of grooves formed therein, a plurality of work chucking members disposed to be detachably clamped in predetermined positions within said grooves, and a plurality of resiliently adjustable work supporting members disposed to be slidably positioned within said grooves.

A further object is to provide an adjustably positionable work securing apparatus disposed to be predeterminately adjusted to constitute a semi-permanent, demountable fixture for releasably securing successive workpieces on which repetitive cutting operations are to be performed.

A still further object is to provide an improved method of securing successive workpieces of different configurations on a work holding table for machining.

According to this invention, a machine tool such as a milling machine is provided with an improved work supporting table having a plurality of enlarged longitudinal and transverse grooves or T-slots disposed to receive a plurality of work securing members for adjustably slidable movement to any predeterminately clamped position thereon. The table together with the work securing members constitutes a demountable chuck or vise which may be adjusted to secure a workpiece of irregular shape and of any size within the capacity of the table. Each of the work securing members is provided with a pair of operatively opposed work clamping jaws arranged in manner that one jaw of each pair may be releasably clamped to the table in predetermined fixed position and the other opposed jaw may be slidably moved toward or away from the fixed jaw. The table itself forms a base for supporting the operably opposed jaws of each work securing member for adjustably slidable movement in the T-slots formed therein, thus obviating the necessity for an intermediate supporting base and making it possible to secure work directly to the surface of the table for maximum rigidity. In order to support portions of an irregularly shaped workpiece in elevated position above the surface of the table, there are provided resiliently adjustable jacks disposed to be slidably moved in the table T-slots to any predetermined position and to function cooperatively with the predeterminately positioned jaws for supporting and securing a workpiece during a cutting operation. The resilient action of the jacks provides an automatic adjustment of the height of the jack to conform to the surface irregularities of workpieces successively placed on the table. Thus, the table together with the work securing members and jacks removably positionable thereon provides a versatile work supporting and work securing apparatus which may be quickly and conveniently adjusted to constitute a semi-permanent fixture for releasably securing irregularly shaped workpieces. Once the initial adjustment of the work chucking table has been effected to accommodate an irregularly shaped workpiece, any number of similarly shaped workpieces may be successively secured to the table.

The foregoing and other objects of this invention, which will become more fully apparent from the following detailed specification, may be achieved by the particular work chucking milling machine table constituting an exemplifying embodiment of the invention illustrated in and described in connection with the accompanying drawings, in which:

Figure 1 is a fragmentary perspective view of a vertical spindle milling machine including a work chucking table incorporating the invention in a preferred practical form;

Fig. 2 is a plan view of the work chucking table showing a plurality of work securing members clamped to the table in manner to secure a workpiece of irregular shape thereto;

Fig. 3 is an enlarged detailed view of a fragment of the table containing a work clamping jaw and base constituting the rearward or releasably clamped portion of the work securing member, taken in transverse vertical section along the line 3—3 in Fig. 2;

Fig. 4 is an enlarged detailed view of a work clamping jaw and base constituting the forward or slidably movable portion of the work securing member, taken in transverse vertical section along the line 4—4 in Fig. 2;

Fig. 5 is an enlarged detailed view of a fragment of the table and a cooperating work securing member showing the cooperatively disposed work clamping jaws and supporting bases, taken in longitudinal vertical section generally along the line 5—5 in Fig. 2;

Fig. 6 is a view in front elevation of a resiliently adjustable work supporting jack; and Fig.7 is a detailed view of the jack taken in transverse vertical section along the line 7—7 in Fig. 6.

Referring more specifically to the drawings and particularly to Fig. 1 thereof, the milling machine there shown incorporates a practical operative embodiment of an improved work supporting and work securing machine tool table to which this invention is directed, the entire apparatus being fully described herein by way of a complete disclosure.

As shown in the drawings, the milling machine illustrated therein is of the vertical spindle, knee and column type and comprises essentially an upstanding combined base and column 8 that carries at its upper forward end a vertically movable head 9, constituting a sliding tool supporting structure in which a vertically disposed spindle 10 is rotatably mounted. A cutter 11 may be mounted on the lower end of the spindle 10 in well known manner either for vertical feeding movement or for vertical adjustment to a fixed position for performing a cutting operation on a workpiece 12 which may be moved beneath the cutter in a horizontal plane.

Beneath the tool spindle 10 and the cutter 11 mounted thereon are arranged superimposed, relatively movable work supporting members, also movably carried by the column, the primary member being a knee (not shown) slidably mounted for vertical movement along the forward face of the column 8 in well known manner. The knee carries a saddle 13 slidably mounted thereon for horizontal movement toward or from the face of the column and that functions to carry an improved work supporting table 14 mounted thereon for horizontal, longitudinal, reciprocating movement transversely to the vertical axis of the tool spindle 10 in manner to feed the workpiece 12 to the cutter 11 mounted in the spindle 10.

The improved table 14 is disposed to constitute a combined work supporting and work securing or chucking apparatus which may be predeterminately adjusted to rigidly and releasably secure a workpiece, for example the workpiece 12, which may then be moved into cutting engagement with the cutter 11. Once the initial adjustment of the table 14 to secure a particular size or shape of workpiece has been effected, any number of similarly shaped workpieces may be quickly and conveniently secured thereto in manner to be in identical cutter engaging relationship. The table 14 is provided with a medial inverted T-shaped slot 16 of standard size centered in and extending longitudinally throughout the entire work supporting surface in well known manner. This standard or normal sized T-slot is disposed to receive aligning lugs and bolts (not shown) for securing rotary tables, vises or other types of attachments having intermediate supporting bases to the table in well known manner.

In accordance with this invention, the table 14 is also provided with a plurality of enlarged T-slots 17 extending transversely to the standard sized T-slot 16 and disposed to accommodate work securing members 19 and 20 for slidable adjustable positioning along the upper surface of the table 14. As shown in Fig. 1, the work securing members 19 and 20 each comprises a pair of work clamping jaws 21 and 22 which have been selectively moved by means of an adjusting screw 23 into clamping engagement with the workpiece 12. In setting up the machine to receive the workpiece 12 for a cutting operation, the jaw 22 is first clamped to the table 14 in the required non-slidable position as will hereinafter be more fully explained. The cooperating jaw 21 is then disposed to be guided by the T-slot 17 for transverse slidable movement relative to the stationarily clamped jaw 22 by an appropriate movement of the adjusting screw 23.

In addition to the transverse T-slots 17, the surface of the table 14 is also provided with a plurality of longitudinal T-slots 25, which are also of enlarged size to receive the work securing members 19 and 20 for longitudinally guided positioning along the surface of the table. Thus, the work securing members 19 and 20 and such additional similar work securing members as may be required, are disposed to be slidably positioned in either the longitudinal T-slots 25 or the transverse T-slots 17 in any combination of positions to accommodate workpieces of various shapes within the capacity of the machine. After the jaw 22 has been clamped to the surface of the table 14, the slidable jaw 21 may be quickly manipulated by movement of the adjusting screw 23 to releasably clamp or chuck any number of similar workpieces which are successively placed on the table 14 for a cutting operation.

In order to more conveniently position successive workpieces on the table 14 in proper cutting relationship to the cutter 11, it may be advantageous to secure bumper stops to the table. For this purpose, the table 14 is provided with a plurality of vertically bored holes 26 which are disposed to receive dowels or bumper stops for locating a workpiece on the surface of the table in well known manner. Each of the vertical holes 26 opens into one of a plurality of horizontally bored holes 27 extending transversely through the table 14 to facilitate cleaning and the removal of metal chips therefrom.

As is more clearly shown in the enlarged view, Fig. 5, the work clamping jaws 21 and 22 of the work securing members 19 and 20 are supported by a pair of opposed bases 28 and 29 respectively and secured thereto by means of cap screws 30. Each of the bases 28 and 29 is of an inverted T-shape provided with outwardly extending flanges in manner to be slidably positionable within the T-slot 17 and in manner that the jaws 21 and 22 respectively carried thereby may be coordinately moved along the surface of the table 14 to any predetermined position for cooperative operation. The jaw 22 and its supporting base 29 may be clamped to the table in the position shown in manner that the opposed jaw 21 and its supporting base 28 are guided by the T-slot for slidable movement toward or away from the clamped jaw 21.

The base 28 on the other hand is provided with upwardly extending abutments 32 which project above the surface of the table 14 to directly support the jaw 21. The under side of the jaw 21 is provided with a longitudinal slot 33 arranged to receive the abutments 32 of the base 28 in such manner that the downwardly extending sides 34 of the jaw are in guiding relationship with the base to prevent lateral deflection of the jaw 21. Whenever the cap screws 30 are drawn up tight, the jaw 21 is supported by the base 32 in manner that there is clearance 35 between the downwardly extending sides 34 of the jaw 21 and the surface of the table 14, and in manner that the base with its jaw detachably secured thereto is guided by the T-slot 17 for slidable positioning along the surface of the table.

In a similar manner, the base 29 is provided with upwardly extending abutments 40 projecting above the surface of the table 14 in manner to fit into a longitudinal slot 41 formed on the under side of the jaw 22. In this instance, however, clearance space 42 is provided between the tops of the abutments 40 and the under side of the jaw 22, so that the downwardly extending sides 34 thereof rest directly upon the surface of the table 14, thus causing the jaw 22 and the base 29 to be clamped to the table 14 whenever the cap screws 30 are drawn up tight. By loosening the cap screws 30 slightly, the clamping action will be released and the base 29 with its detachably secured jaw 22 may be slidably positioned within the T-slot 17.

In order to maintain the bases 28 and 29 with their detachably secured jaws 21 and 22 in operably opposed relationship, the adjusting screw 23 is threaded through the bases 28 and 29, the base 28 being provided with a left handed thread 43, and the base 29 being provided with a right handed thread 44. Complementary left and right hand threaded portions of the adjusting screw 23 are disposed to cooperate with the left and right handed threads 43 and 44 of the bases 28 and 29 respectively in manner that rotation of the adjusting screw in one direction will effect movement of the bases toward one another while rotation of the adjusting screw in the opposite direction will effect movement of the bases away from one another. The adjusting screw 23 is disposed to be entirely within the T-slot 17 and below the surface of the table 14, and is provided with a squared end 45 for effecting rotational movement thereof.

As hereinbefore explained, the entire work supporting member 19 including the jaws 21 and 22, the jaw supporting bases 28 and 29 respectively, and the adjusting screw 23 is guided for slidable positioning along the surface of the table by the T-slot 17 to any required position. When the jaw 22 and its supporting base 29 are clamped to the table 14 by tightening the cap screws 30, the opposed jaw 21 and its supporting base 28 are slidably movable relative to the stationarily clamped jaw by an appropriate movement of the adjusting screw 23 in manner similar to the operation of a work holding vise or chuck. When the cap screws 30 are loosened to permit slidable movement of the jaw 22 and its supporting base 29, the entire device 19 may be unitarily removed from the transverse T-slot 17 as a unit and slidably positioned in any other of the transverse T-slots or in any of the longitudinal T-slots 25. In effect therefore, the work supporting table 14 together with the work securing members 19 and 20 removably positionable thereon constitute a large expansible and demountable vise which may be predeterminately adjusted for supporting and securing various sizes of workpieces.

In order to secure varying sizes of workpieces to the table 14, the capacity of the work securing member 19 may be varied by relocating the work clamping jaws 21 and 22 on their respective supporting bases 28 and 29 to vary the maximum distance obtainable between the work clamping faces 46 of the jaws whenever the work securing member is in its extreme open position. To this end, as shown in Fig. 5, the under side of the jaw 21 is provided with a transverse slot disposed to receive a key 47 which forms an abutment projecting downwardly into the longitudinal slot 33 and joining the downwardly extending sides 34 thereof. The upper surface of the base 28 is provided with three transverse slots 48, 49 and 50 which are formed between the abutments 32 extending upwardly from the base, and any one of which may receive the key 47 of a cooperating jaw. For example, the jaw 21 is positioned on the base 28 in manner that the key 47 engages the rearward slot 48 formed therein and in manner that the work clamping face 46 of the jaw 21 is a proportionate distance rearward of the front end of the base 28. Thus, there will be a greater distance between the work clamping faces 46 than if the jaw 21 were located on the base 28 with the key 47 engaging the central slot 49 or the forward slot 50.

It will be apparent that the jaw 21 may be located on the base 28 in manner that the key 47 engages any one of the transverse slots 48, 49 or 50 formed therein, in accordance with the size of the workpiece to be secured between the opposed faces 46 of the jaws 21 and 22. As shown in Fig. 5, the opposed jaw 22 is located on and secured to its supporting base 29 by means of cap screws 30 in manner that the key 47 secured to the jaw 22 engages the central transverse slot 49 formed in the base 29. The jaw 22 may likewise be positioned on its supporting base 29 in manner that the key 47 engages any of the three transverse slots 48, 49 or 50 formed therein.

The jaws 21 and 22 are of identical construction and each of them may be of the reversible type, as illustrated in Fig. 5, disposed to be reversibly and interchangeably mounted on the bases 28 and 29 respectively, in such manner that either the work clamping faces 46 or alternatively, stepped jaw faces 52 are in operably opposed work clamping relationship. Thus, the capacity of the work securing member 19 may also be varied to support and to secure workpieces of a larger size by reversing the position of work clamping jaws 21 and 22 upon the bases so that the stepped jaw faces 52 are in operatively opposed work clamping relationship.

In normal use, the work securing members 19 and 20 are first clamped to the table 14 in predetermined position as shown in Fig. 1 and as hereinbefore explained, and then adjustably moved to secure the workpiece 12 to the surface of the table. In order to prevent the distortion or springing of an irregularly shaped workpiece during the clamping operation however, it may be advantageous to utilize a third slidably movable work securing member 54 similar to and in combination with the two stationarily clamped work securing members 19 and 20, as shown in Fig. 2. As there shown, an irregularly shaped workpiece 55 is secured to the table 14 by first clamping its outer ends between the opposed jaws of the stationarily positioned work securing members 19 and 20. The third work securing member 54 is positioned in the centrally located transverse T-slot 17 for slidable movement along the surface of the table and in manner that the central curved portion of the irregularly shaped workpiece 55 is supported between the open jaws 21 and 22 thereof. A socket wrench 58 may be inserted within the T-slot 17 and applied to the squared end 45 of the adjusting screw 23 for rotating the screw to move the work securing jaws 21 and 22 of the securing member 54 into clamping engagement with the workpiece 55.

After the workpiece 55 has been located and secured to the table 14 by means of the stationarily clamped work securing members 19 and 20, the intermediate securing member 54 will be slidably moved along the surface of the table in accordance with the exact location of the curved portion of the workpiece 55, as the jaws 21 and 22 are moved into work clamping engagement therewith. After the work securing member 54 has been slidably positioned on the table 14 by clamping the jaws, the cap screws 30 may be tightened to securely clamp the vise jaw 22 to the table in a fixed non-slidable position as hereinbefore explained and in manner that all of the work securing members 19, 54 and 20 will be stationarily clamped to the table 14 for more rigidly securing the irregularly shaped workpiece 55 which will be clamped between the respectively opposed jaws at three points along its length.

Because there may be slight variations in the size or shape of similar workpieces to be successively secured to the table, it is necessary to slidably reposition the intermediate or centrally located work securing member 54 in relation to the stationarily clamped work securing members 19 and 20 in order to avoid distortion of the workpiece each time a new workpiece is chucked on the table. By loosening the cap screws 30 in the jaw 22 of the intermediate work securing member 54, the jaw may be released from clamping engagement with the table for slidable repositioning thereon in conformance with the exact location of similarly shaped workpieces successively placed on the table 14 and as determined by the stationarily clamped work securing members 19 and 20.

It will be apparent that a plurality of work securing members may be positioned for slidable adjustment on the surface of the table in relation to stationarily clamped work securing members to be located as described with reference thereto for securing any size or shape of workpiece to the table with a minimum of distortion. This method of securing a workpiece to the machine table during a cutting operation obviates the necessity for using various individual straps and bolts having T-shaped heads to hold the work and facilitates the mounting of workpieces on the machine table as well as their removal therefrom.

The table 14 together with a plurality of the slidably and adjustably positionable work securing members, such as the members 19, 54 and 20, comprises a work chucking table particularly adapted to secure or chuck an irregularly shaped workpiece. Inasmuch as the work securing members or chucking elements 19, 54 and 20 may be positioned either parallelly or transversely to each other within the T-slots 17 or 25, the work chucking table 14 provides an extremely versatile and conveniently adjustable chucking device for releasably securing similar workpieces upon which cutting operations are to be successively performed.

Although the embodiment of the invention illustrated in the drawings is particularly adapted for securing a workpiece directly to the surface of the table for increased rigidity during a cutting operation, it is sometimes necessary to support either the entire workpiece or portions of the workpiece in an elevated position slightly above the surface of the table. For added convenience in supporting successive workpieces a predetermined height above the surface of the table 14, there is provided a quick acting and resiliently adjustable jack 64. As shown in Fig. 1, the jack 64 has been predeterminately positioned on the surface of the table 14 for cooperative use with the predeterminately positioned work securing members 19 and 20 in manner to rigidly support the central portion of the workpiece 12.

As more clearly shown in Figs. 6 and 7, the jack comprises a base 65 disposed for adjustable slidable positioning in either of the transverse T-slots 17 or the longitudinal T-slots 25 and having an upper cylindrical portion 66 threaded to receive a lock nut 67. A plunger 68 is vertically carried by the base 65 for limited axial slidable movement and is resiliently urged to its upper limit of movement by means of a compression spring 69. For limiting vertical movement of the plunger 68 and for preventing rotational movement thereof, the plunger is provided with a slot 70 disposed to receive the inwardly extending end of a screw 71 threaded through one wall of the base 65. The plunger is also provided with an angular flat surface 72 inclined downwardly toward the axis of the plunger and disposed to form a seat for the inwardly extending end of a lock screw 73 threaded through the wall of the base 65. For urging the screw 73 into locking engagement with the angular surface 72 to lock the plunger against downward slidable movement, the T handled socket wrench 58 may be applied to a squared end 74 of the lock screw. For directly supporting a workpiece a predetermined height above the table, a jack screw 76 is threaded into the plunger for manual adjustment to the required predetermined height, as shown in Fig. 1.

For positioning the jack 64 to properly support a workpiece, the jack is first slidably moved within the T-slot 17 to a predetermined position as shown in Fig. 1, and locked to the table 14 by tightening the lock nut 67 to exert pressure on a washer 77 which rests directly on the surface of the table. With the inner end of the lock screw 73 in retracted position to permit resilient movement of the plunger 68 to its upper limit of movement, the jack screw 76 is then rotated into supporting contact with the workpiece 12 until the plunger 68 is forced downwardly to its median position within its allowable range of resiliently urged vertical movement. Since the spring 69 operates to urge the plunger 68 and the jack screw 76 upwardly into supporting contact with the workpiece 12, the lock screw 73 may then be tightened to lock the plunger against any downward movement for retaining the jack screw 76 in position to rigidly support the workpiece 12 during the cutting operation. After the workpiece has been removed from the table, the end of the lock screw 73 may again be retracted to permit resiliently urged upward movement of both the plunger 68 and the jack screw 76.

Thus, as similarly shaped workpieces are successively placed in position on the machine table 14, the jack screw 76 and the plunger 68 will be depressed the proper distance for maintaining the upper surface of the jack screw in resiliently urged supporting contact with the workpiece. After initial manual adjustment of the jack screw 76 to its proper work supporting height, the resiliently urged upward movement of the plunger 68 will effect an automatic adjustment in the height of the jack screw to conform to individual surface variations on the under side of workpieces successively placed on the machine table. After the jack screw has been resiliently adjusted to its proper work supporting height by the placement of a workpiece on the machine table, the lock screw 73 may again be tightened to maintain this adjustment during the cutting operation.

From the foregoing explanation of the construction and operation of a preferred embodiment of the invention, it is apparent that the invention has provided an improved work supporting and work securing or chucking table for a milling machine that is versatile and convenient to set up for supporting and removably securing similarly shaped workpieces successively placed on the machine table for repetitive cutting operations.

Although only one embodiment of the invention has been shown and described, it will be apparent to those skilled in the art to which this invention relates, that various modifications in the manner of constructing the machine table and the removably positionable work securing clamps may be effected without departing from the spirit and scope of the invention as defined in the subjoined claims.

The principles of the invention having now been fully explained in the foregoing description of embodying apparatus, I hereby claim as my invention:

1. In a machine tool having a work supporting table presenting an inverted T-slot, a clamping screw provided with oppositely threaded sections disposed within said T-slot, a pair of blocks slidably fitted in said T-slot and presenting threaded openings receiving the oppositely threaded sections of said screw respectively one of said blocks projecting slightly above the other, and a pair of chuck jaws secured to said blocks respectively in position to bridge said slot, the jaw secured to the lower of said blocks serving to clamp said block to said table in selected fixed position and the jaw secured to the projecting block being free to slide over the top of said table, whereby a workpiece on the table surface may be gripped between said jaws by effecting movement of said slidable jaw through operation of said clamping screw.

2. A machine tool having a work retaining table mechanism comprising a table slidably mounted for longitudinal movement including a plurality of longitudinal and transverse T-slots integrally formed in its upper surface, a plurality of work securing mechanisms each selectively positionable in any one of said T-slots, a pair of T-shaped base members for each of said work securing mechanisms, an adjusting screw threadedly disposed in each pair of base members to effect uniform movement toward or away from each other upon rotation of said screw, a work engaging jaw mountable on one of said base members, a clamping means selectively operable on said jaw and base member to permit selective locking thereof in a T-slot whereby said jaw when fixedly retained on said table serves to locate and retain a workpiece mounted thereon, and a second work engaging jaw adjustably mountable on the other base member in a manner to space said jaws to receive a workpiece and permit the second named jaw to be selectively moved to engageably clamp the workpiece, whereby a plurality of said work securing mechanisms mounted directly on said work retaining table serve to secure a workpiece thereto.

3. A chucking vise mechanism for a machine tool work retaining table having a plurality of longitudinal and transverse T-slots and comprising a T-shaped base member slidably mounted in one of said T-slots and having a plurality of laterally disposed slots on its top surface, a work engaging jaw having a longitudinal slot corresponding to the width of the top surface of said base member, a locating block secured within the longitudinal slot of said jaw and disposed to engage one of the lateral slots in said base member and accurately align said jaw with said base member for unitary movement therewith, a clamping means disposed to permit selective clamping of said jaw and base member in any position along one of said T-slots, a second base member having laterally disposed slots on its top surface, a second work engaging jaw having a longitudinal slot corresponding to the width of the top surface of said second named base member, a locating block mounted within said longitudinal slot of said jaw and disposed to engage one of the lateral slots in said second named base member and insure accurate alignment therebetween, a securing means to mount said second named jaw selectively on the top of said second named base member and permit said base member to remain slidably disposed in the T-slot of said table, and an adjusting screw oppositely threaded at its ends for threaded engagement with said first named base member and said second named base member beneath the surface of said table, whereby rotation of said adjusting screw serves to simultaneously move said base members and associated jaws in opposite directions in one of said T-slots on said table and clampably engage a workpiece disposed between said jaws whereafter said clamping means of said first named jaw may be actuated to secure said first named base member and jaw in said T-slot and thereby secure the workpiece to said table.

4. In a work retaining table for a machine tool including a plurality of longitudinal and transverse T-slots formed in its upper work surface, a plurality of work securing mechanisms selectively positionable in any one of said longitudinal or transverse T-slots, a pair of T-shaped base members for each of said work securing mechanisms, an adjustable screw threadedly retained in each pair of base members in said T-slot beneath the surface of said table and disposed to advance or retract said base members within said slot, a pair of work engaging jaws adjustably securable on said base members, and a clamping means associated with one of said jaws and base members to unitarily lock said member and jaw in the T-slot of said table, whereby a plurality of work securing mechanisms may be utilized in the said longitudinal and transverse T-slots of said table to properly position a workpiece for a machining operation and fasten the workpiece to said table upon the operation of the clamping means on each of said work securing mechanisms.

5. In a milling machine, a cutting tool, a work supporting table carried for reciprocable movement relative to said cutting tool, said table being provided with a plurality of greatly enlarged inverted T-slots, and a work chucking device removably engageable with one or another of said T-slots and comprising a pair of T-shaped bases slidably positionable within one or another of said T-slots, one of said bases having an upper jaw receiving surface slightly lower than the upper surface of said table, a work chucking jaw removably secured to each of said bases respectively in a selected position of longitudinal adjustment thereon, one of said jaws being adapted to cooperate with the said base having a lower jaw receiving surface to constitute a clamping device for securing the respective said jaw and said base to the said table in a selected position of adjustment therealong, and a vise screw operatively connecting said bases to effect relative movement therebetween, said screw being disposed entirely beneath the surface of said table within one of said T-slots whenever said bases are operatively engaged in a selected one of said T-slots.

(References on following page)

References Cited in the file of this patent

UNITED STATES PATENTS

| Number | Name | Date |
|---|---|---|
| 348,299 | Stehman | Aug. 31, 1886 |
| 508,732 | Mason | Nov. 14, 1893 |
| 681,199 | Crane | Aug. 27, 1901 |
| 1,187,856 | Moss | June 20, 1916 |
| 1,197,286 | Hannay | Sept. 5, 1916 |
| 1,254,044 | Johnson | Jan. 22, 1918 |
| 1,285,834 | Stull | Nov. 26, 1918 |
| 1,326,804 | Taylor | Dec. 30, 1919 |
| 1,471,118 | Gething | Oct. 16, 1923 |
| 1,674,291 | Malone | June 19, 1928 |
| 1,948,600 | Templeton | Feb. 27, 1934 |
| 2,176,608 | Marsilius | Oct. 17, 1939 |
| 2,247,656 | Friedrich | July 1, 1941 |
| 2,424,090 | Gordinier | July 15, 1947 |